United States Patent Office 3,074,498
Patented Jan. 22, 1963

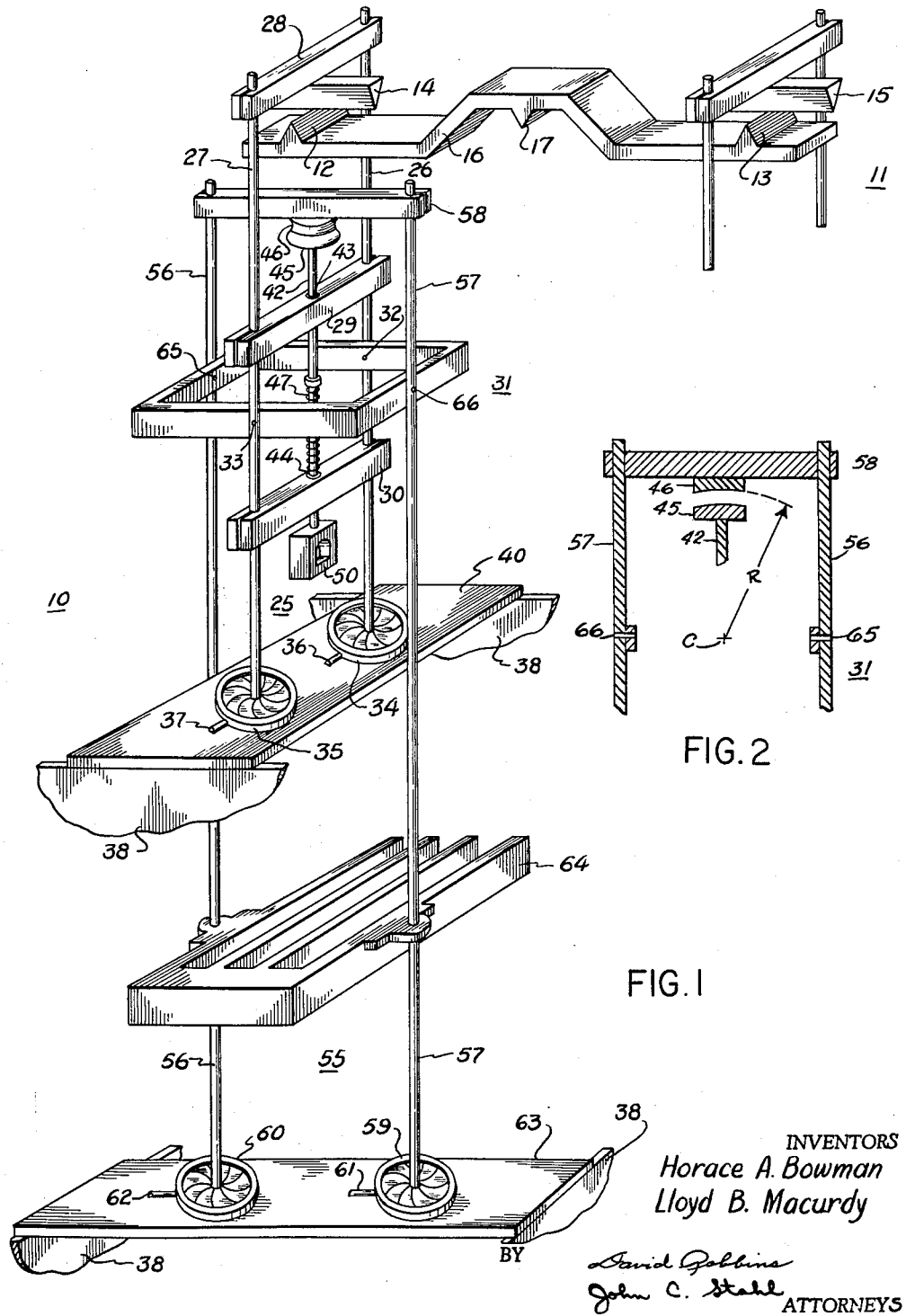

3,074,498
DEVICE FOR MINIMIZING THE EFFECTS OF MAL-CENTERED BALANCE PAN LOADING
Horace A. Bowman and Lloyd B. Macurdy, Silver Spring, Md., assignors to the United States of America as represented by the Secretary of Commerce
Filed Feb. 28, 1961, Ser. No. 92,426
5 Claims. (Cl. 177—255)

This invention relates to a device for minimizing the effects of mal-centered balance pan loading.

Ideally, the suspension of a balance hangs in such a manner that the center of gravity of the suspended mass (suspension plus load) lies motionless on a vertical axis passing through the effective point of support. In practice, however, a conventional suspension swings like a pendulum about this axis at an amplitude which is largely a function of the displacement of the center of gravity from this vertical axis at the instant of release. This swinging causes error in observed turning points. Upon release, the mechanical shock impressed on a conventional multiple link suspension as it takes on a tension load causes it to vibrate transversely at an amplitude which is also largely determined by the displacement of the center of gravity of the various links from the vertical axis. These vibrations tend to alter the relative positions of the various knives and flats, thereby changing arm length and sensitivity from one experiment to the next. To place the load on the pan in such a position that the horizontal projection of the center of gravity of the suspended mass is unchanged requires precise knowledge of the center of mass of the load, which is rarely available. To release the conventional suspension so gently that vibration and swinging are not excited demands a slowly operating mechanism which is inconsistent with the requirements of a high speed, high precision balance.

Accordingly, it is an object of the present invention to position the center of gravity of the suspended mass at the instant of release on a vertical axis passing through the effective point of support.

Another object is to provide a suspension that in effect is a single structure having a minimum tendency to vibrate transversely when released.

This is accomplished by inserting in the suspension a universal joint, for example a gimbal, above the load pan and below the point of attachment to the beam. The universal joint is connected in such a manner that the load is delivered in its entirety to the beam through the joint and is constructed so that it may be locked or unlocked. When unlocked it provides universal action; when locked, the universal action is inhibited either completely, in which case the two members described below act like a rigid body, or to an extent which results in a damped universal characteristic.

In the description below, the term "upper member" refers to the portion of the suspension, connected to the universal joint, that is attached to the beam. The term "lower member" refers to the portion of the suspension, connected to the universal joint, in which the pan is located.

The point of attachment of the upper member to the joint is positioned so that if this portion of the suspension alone were suspended from the beam the effective point of rotation of the universal joint would hang gravitationally below the point of attachment to the beam.

With the universal joint installed in the suspension, the objects of the present invention may be attained by the following loading sequence:

(1) The upper member is clamped in its normal rest position gravitationally below its attachment to the beam. The lower member may be clamped for convenience in loading.

(2) The load is placed upon the pan. During this step the universal joint may be either locked or unlocked.

(3) If locked, the universal joint is unlocked. If in step 2 the weight was positioned on the pan so that the combined center of gravity of the load plus the lower member is not gravitationally below the point of rotation of the joint, the lower member, plus the load, will swing until the combined center of gravity is so located.

(4) When the lower member has gravitationally positioned itself thus, the universal joint is locked, thereby forming the upper and lower member into a single rigid body.

(5) The center of gravity of both the upper and lower member is now gravitationally aligned so that the suspension may be released.

In the Figure:

FIG. 1 is an embodiment of the present invention.

FIG. 2 is a cross section of a portion of the lower member in FIG. 1, which shows convex surface 45 and concave surface 46 in detail.

Referring to FIG. 1, suspensions 10 and 11, the latter shown only in part, are supported on end knives 12 and 13 by flats, not shown, and intermediate knives 14 and 15. The end knives rest on beam 16 which in turn is supported on center knife 17. Since suspension 11 has the same construction as suspension 10, the former need not be discussed further.

Suspension 10 has an upper member 25 that includes rods 26, 27 tied together by members 28, 29, 30. Member 28 rests on intermediate knife 14. It is understood that the upper member could be supported on beam 16 by another type of hinge mechanism such as a flexure plate. Rods 26, 27 are connected to opposite sides of gimbal 31 through suitable means such as ball bearings 32, 33 and extend through iris-like devices 34 and 35. The latter, which may be opened or closed by handles 36, 37, respectively, are attached to balance case 38 through plate 40. It is understood that instead of gimbal 31, which is one type of universal joint, any one of a large variety of universal joints could be used.

Locking rod 42 is positioned in sapphire guide bushings 43, 44 which are located in members 29, 30, respectively. The locking rod may be moved vertically without changing the horizontal projection of the center of gravity of upper member 25. Convex surface 45, connected to the end of the locking rod, is urged against concave surface 46 by spring 47. (See FIG. 2.) When the surfaces are spring loaded together, their common curvature R is centered at the center of rotation C of gimbal 31. When a downward force is applied to element 50, which is attached to one end of locking rod 42, the rod is urged against spring 47 and surfaces 45, 46 are disengaged.

Lower member 55 of suspension 10 includes rods 56, 57 which are tied together by member 58, gimbal 31 and pan 64. The rods extend through iris-like devices 59, 60. The latter, which may be opened or closed by handles 61, 62, respectively, are attached to balance case 38 through plate 63. It is understood that instead of devices 34, 35 and 59, 60 other conventional clamping means may be used. Pan 64 is supported on rods 56, 57 which are connected to opposite sides of gimbal 31 through ball bearings 65, 66.

In one mode of operation, during the pan-loading process upper member 25 is clamped firmly in its normal rest position by iris-like devices 34, 35 so that its center of gravity lies vertically below the center of end knife 12. Lower member 55 is locked to the upper member by surfaces 45, 46 which are spring loaded together and is clamped to case 38 by iris-like devices 59, 60. After the load is placed on pan 64, devices 59, 60 are opened and locking rod 42 is pulled vertically downward rapidly, several times against spring 47 by a force applied to element 50. This frees lower member 55 to rotate around the center of rotation of gimbal 31 until its center of gravity lies vertically below this center of rotation. Locking rod 42 is then permitted to move upward until surfaces 45, 46 are in firm contact after which iris-like devices 34, 35 are opened to release suspension 10. Since the center of gravity of the suspended mass now lies on a vertical axis through the effective point of support, the tendency of the suspension 10 to swing is minimized. Also, upon release suspension 10 is effectively a single-link suspension (by virtue of the lock between upper and lower members 25, 55) so the tendency to vibrate transversely is minimized.

Obviously many modifications and variations of the present invention are possible in the light of the above teachings. For example, instead of using locking rod 42 and surfaces 45, 46, bearings 32, 33, 65, 66 may be locked with a break shoe or the bearings may be lubricated with a high viscosity fluid. In the latter case, due to the high viscosity, lower member 55 would fall to its gravitationally aligned position with the effective point of support and would remain there while the load on pan 64 is being weighed. Again, surfaces 45, 46 could be selected so that friction between the surfaces will permit the gravitational pull to slide lower member 55 to its desired position. The only requirement is that the arrangement employed lock members 25, 55 together so that the members behave as a single structure.

It is therefore to be understood, that within the scope of the appendent claims, the invention may be practiced otherwise than as specifically described.

What is claimed is:

1. In a balance, an upper member, a beam, means for supporting said upper member at a point of support on said beam, a lower member including a pan, a universal joint pivotally connected between said lower and upper member, a fixed element, means for selectively clamping said upper member to said fixed element so that the center of gravity of said upper member lies substantially on the same vertical axis with said point of support, means for selectively clamping said lower member to said fixed element, and means for locking said lower member to said upper member.

2. The balance in claim 1 wherein said last mentioned means comprises a first surface located on said lower member, a second surface located on said upper member, said first and second surface being positioned so that when locked together the center of their common area is located on a vertical axis through the center of rotation of said universal joint, and means for locking said first surface to said second surface.

3. In a balance, an upper member having a first and second rod, a beam, means for supporting said upper member at a point of support on said beam, a lower member including a pan and having a third and fourth rod, a universal joint having a first and second pair of opposite sides, means for pivotally connecting said first rod to one and said second rod to the other of said first pair of opposite sides, means for pivotally connecting said third rod to one and said fourth rod to the other of said second pair of opposite sides, a fixed element, means for selectively clamping said upper member to said fixed element so that the center of gravity of said upper member lies substantially on the same vertical axis as said point of support, means for clamping said lower member to said fixed element and means for locking said lower member to said upper member.

4. The balance in claim 3 wherein said last mentioned means compirses a first surface located on said lower member, a second surface located on said upper member, said first and second surface being positioned so that when locked together the center of their common area is located on a vertical axis through the center of rotation of said universal joint, and means for locking said first surface to said second surface.

5. The balance set forth in claim 3 wherein said last mentioned means comprises a concave surface located on said lower member, a convex surface located on one end of a locking rod, said concave and convex surface being positioned so that when locked together the center of their common curvature is centered at the center of rotation of said universal joint, means for slidably supporting said locking rod on said upper member, said last mentioned means positioned so that said locking rod may be moved vertically without changing the horizontal projection of the center of gravity of said upper member, and means for urging said locking rod in a direction such that the concave surface engages said convex surface.

References Cited in the file of this patent
UNITED STATES PATENTS 490,541     Case _____ Jan. 24, 1893